(12) United States Patent
Clare

(10) Patent No.: US 10,214,363 B1
(45) Date of Patent: Feb. 26, 2019

(54) PNEUMATIC SLIDE ASSEMBLY FOR MATERIAL HANDLING

(71) Applicant: J.C. Automation, Inc., Walcott, IA (US)

(72) Inventor: Joshua Arden Clare, Walcott, IA (US)

(*) Notice: Subject to any disclaimer, the term of this patent is extended or adjusted under 35 U.S.C. 154(b) by 0 days.

(21) Appl. No.: 15/728,731

(22) Filed: Oct. 10, 2017

(51) Int. Cl.
*B65G 35/00* (2006.01)
*F16C 32/06* (2006.01)

(52) U.S. Cl.
CPC .......... *B65G 35/00* (2013.01); *F16C 32/0614* (2013.01); *F16C 2326/58* (2013.01)

(58) Field of Classification Search
CPC ................................. B60V 3/04; B65G 35/00
USPC .......................................................... 414/676
See application file for complete search history.

(56) References Cited

U.S. PATENT DOCUMENTS

| | | | | |
|---|---|---|---|---|
| 3,108,698 A * | 10/1963 | Petersen | .................. | B60V 3/04 414/676 |
| 3,595,171 A * | 7/1971 | Sheppard | .................. | B60V 3/04 104/134 |
| 3,820,467 A * | 6/1974 | Burdick | .................. | B60V 3/025 104/134 |
| 4,085,681 A * | 4/1978 | Barber | ..................... | B60V 3/04 104/108 |
| 4,275,983 A * | 6/1981 | Bergman | ............. | B23Q 16/001 198/345.3 |
| 4,347,791 A * | 9/1982 | Mandros | .................. | B60V 3/04 104/138.1 |
| 4,567,957 A * | 2/1986 | Johnson | ............... | B62D 55/062 180/124 |
| 4,815,926 A * | 3/1989 | Chaffee | .................. | B60V 3/025 180/124 |
| 5,308,218 A * | 5/1994 | Kobayashi | ............... | B65G 7/06 180/125 |
| 5,439,341 A * | 8/1995 | Yamazaki | ................ | B23Q 1/38 384/12 |
| 5,452,983 A * | 9/1995 | Parmley, Sr. | ............. | B60S 5/06 414/345 |
| 5,862,718 A * | 1/1999 | Kiesling | ................... | B23Q 1/38 269/20 |
| 6,491,435 B1 * | 12/2002 | Nishikawa | ............ | F16C 29/025 384/12 |
| 8,191,227 B2 * | 6/2012 | Brackley | .............. | B65G 49/065 269/21 |

* cited by examiner

*Primary Examiner* — Jonathan Snelting
(74) *Attorney, Agent, or Firm* — McKee, Voorhees & Sease, PLC

(57) ABSTRACT

A pneumatic material handling slide assembly and method is provided to accommodate work pieces of various sizes at a manufacturing site. The assembly includes a lower base plate fixed to the floor and an upper plate slidably mounted on top of the lower plate. An air pocket is provided in the lower surface of the upper plate. Compressed air can be supplied to the air pocket to lift the upper plate and associated material handling equipment for sliding along the lower base plate. Locks are provided on the upper plate to secure the upper plate in a desired position along the lower plate.

18 Claims, 11 Drawing Sheets

PNEUMATIC SLIDE ASSEMBLY FOR MATERIAL HANDLING

FIELD OF THE INVENTION

The present invention relates to a sliding assembly and method for material handling for use in various industries, including manufacturing, commercial business, automotive shops, maintenance and repair facilities, and other enterprises which hold, support, move, and handle products of all types. The assembly and method accommodates work pieces and objects having various lengths, and provides an easy, safe, and effective movement of face plates for holding and supporting the work pieces.

BACKGROUND OF THE INVENTION

Many businesses such as, manufacturing, often require the handling of work pieces and materials having various sizes and shapes which must be held and supported for performance of various work operations. Conventional equipment often utilizes supports or face plates at each end of the work piece, with one or both of the face plates being moveable along tracks so as to accommodate different length work pieces. The tracks often run along the floor of the work site, particularly for heavy pieces. Linear bearings are provided on the tracks for rolling the face plate(s) to different positions along the track. Use of linear bearings presents issues, including wear, failure, and contamination. The tracks also present a tripping hazard in the work place, since the tracks typically rise above the floor a distance of two inches or more. Also, the floor rails tend to be smooth or slick, which creates a hazard of falling for people in the work place, if they step on a rail.

Accordingly, there is a need in the manufacturing industry for improved means and methods for material handling movement which provides adjustability for unique and different manufacturing requirements.

Thus, a primary objective of the present invention is the provision of an improved material handling assembly which allows for quick, easy, and safe movement of various work pieces at the manufacturing site.

Another objection of the present invention is a provision of a pneumatic material handling assembly capable of supporting and sliding heavy work pieces of various sizes.

A further objective of the present invention is a provision of a material handling method for manufacturing operations, and using a lower base plate and an upper sliding plate to adjust the distance between material support members.

Yet another objective of the present invention is the provision of a pneumatic slide assembly for material handling wherein pressurized air lifts or floats an upper slide plate above a lower base plate.

A further objective of the present invention is a provision of a pneumatic slide assembly for material handling and a manufacturing work site which eliminates bearings.

Still another objective of the present invention is the provision of a pneumatic slide assembly for work piece handling during manufacturing which has a low profile to minimize or eliminate tripping and falling hazards at the work site.

A further objective of the present invention is the provision of a material handling assembly and method which is economical, durable, and safe.

These and other objectives have become apparent from the following description of the invention.

SUMMARY OF THE INVENTION

The pneumatic material handling assembly of the present invention is adapted for holding or supporting objects, products, and work pieces having various sizes, in numerous businesses and industries. The assembly includes a lower plate fixed to the floor at the manufacturing site, and an upper plate slideably mounted on top of the lower plate. An air pocket is formed in the lower surface of the upper plate. An air inlet operably connected to a source of pressurized air is provided in the upper plate in communication with the pocket. When pressurized air is introduced into the pocket via the air inlet, the air lifts or floats the upper plate relative to the lower plate and allows the upper plate to slide or move along the lower plate. A first material support or face plate is mounted on the lower plate and a second material support or face place is mounted on the upper plate. Thus, sliding movement of the upper plate relative to the lower plate adjusts the distance between the material supports or face plates, thereby accommodating work pieces having various lengths. The upper and lower plates preferably made of steel, and have a thin profile. For example, the lower plate may have a maximum thickness of 1 inch, so as to minimize a tripping risk at the work site. The pneumatic slide assembly is free from bearings and other mechanical components which otherwise are subject to wear, failure, and contamination. The floating upper plate also eliminates or minimizes friction between the upper and lower plates during movement along the upper plate. Locks are provided on the upper plate so as to fix the upper plate in a desired position along the lower plate.

DETAILED DESCRIPTION OF THE DRAWINGS

Figure 2:
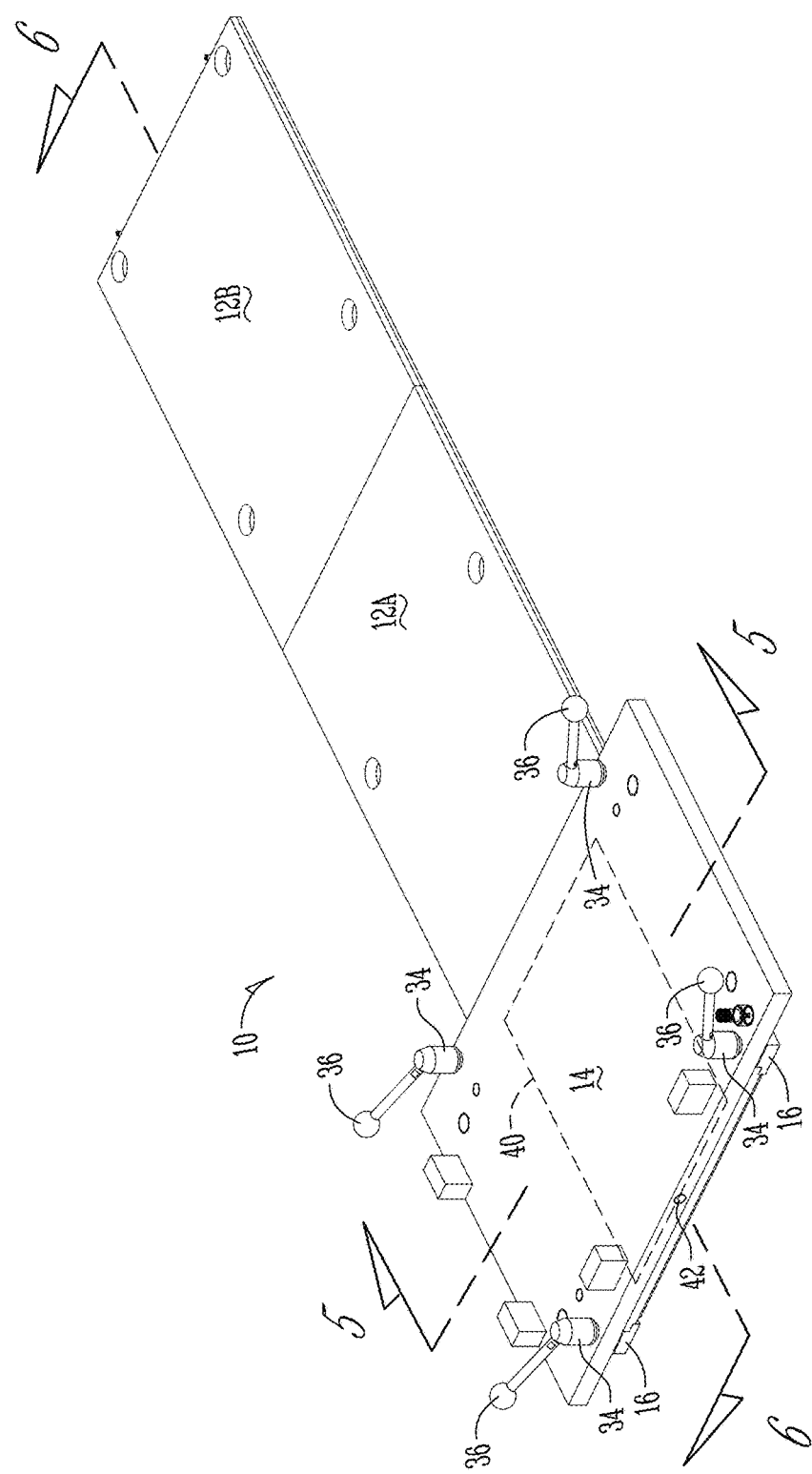
FIG. 2 is a top perspective view of the assembly, without the face plate.
Figure 3:
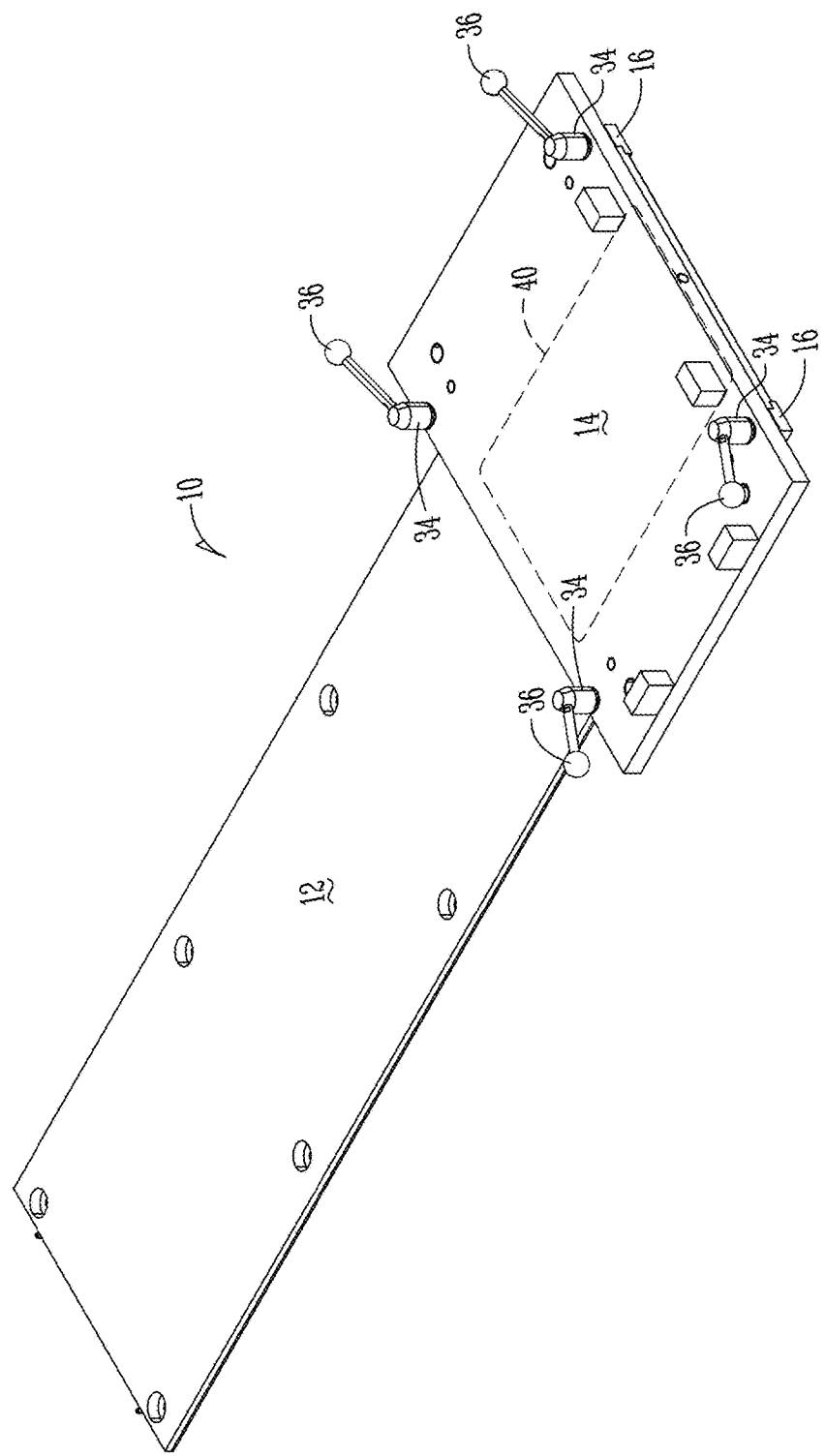
FIG. 3 another top perspective view of the assembly.

The pneumatic material handling assembly of the present invention is generally designated in the drawings by the reference numeral 10. The assembly 10 includes a base 12, which preferably is a thin steel plate, which may be formed in one or more sections, such as plate sections 12A, 12B (FIG. 2) set end-to-end to achieve a desired length of the base 12. An upper plate 14 is slideably mounted on top of the base plate 12. In the preferred embodiment, the upper plate 14 has a width which is greater than the lower plate 12, such that the opposite sides of the upper plate 14 extend beyond the opposite sides of the lower plate 12.

Figure 4:
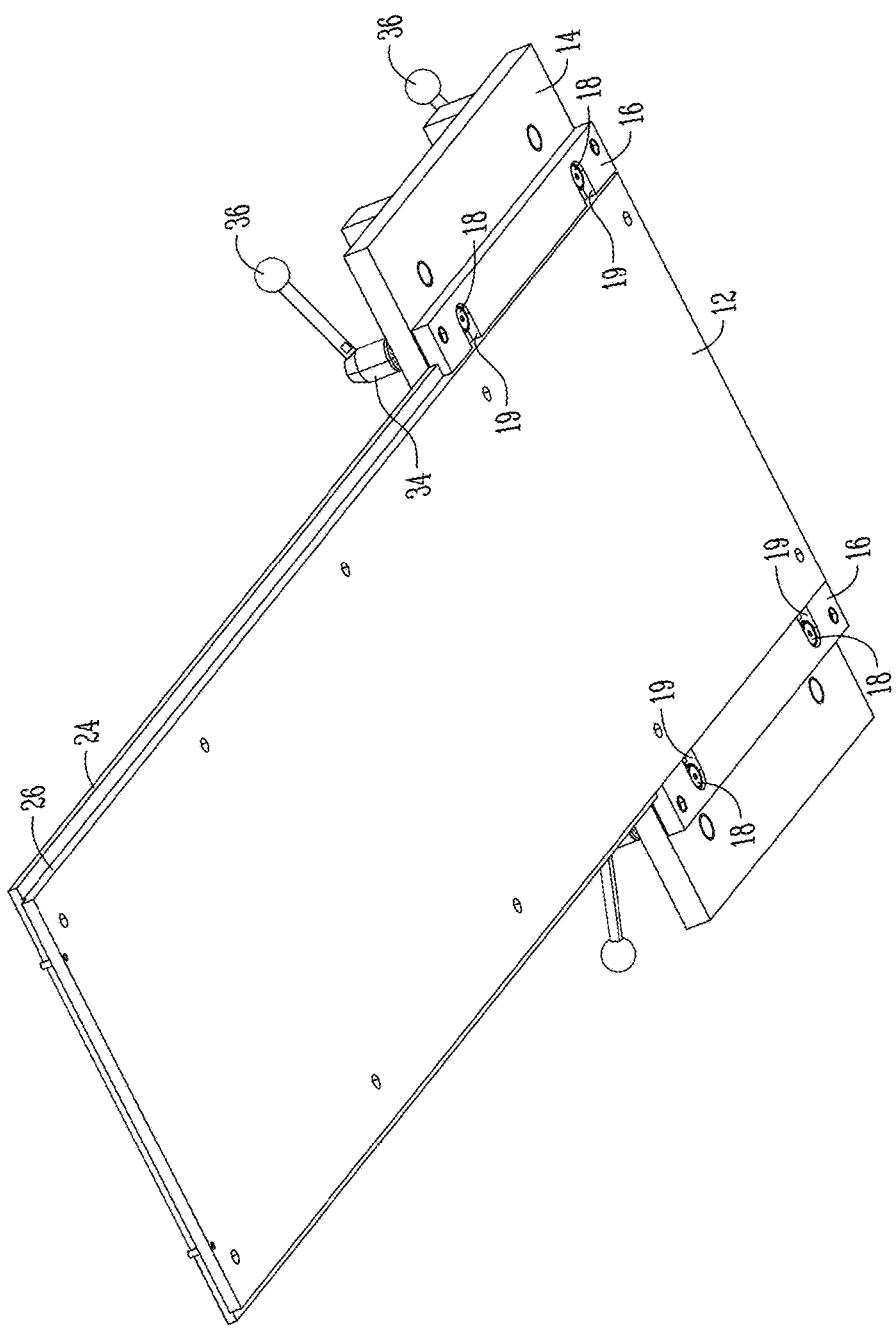
FIG. 4 is a bottom perspective view of the assembly.
Figure 5:
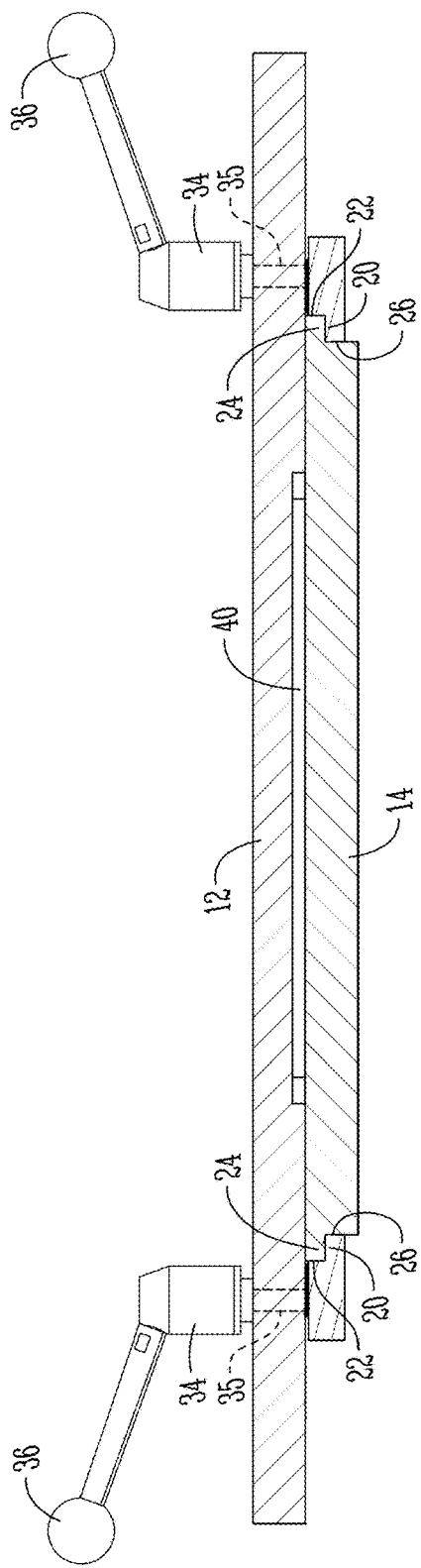
FIG. 5 is a sectional view of assembly taken along lines 5-5 of FIG. 2.
Figure 6:
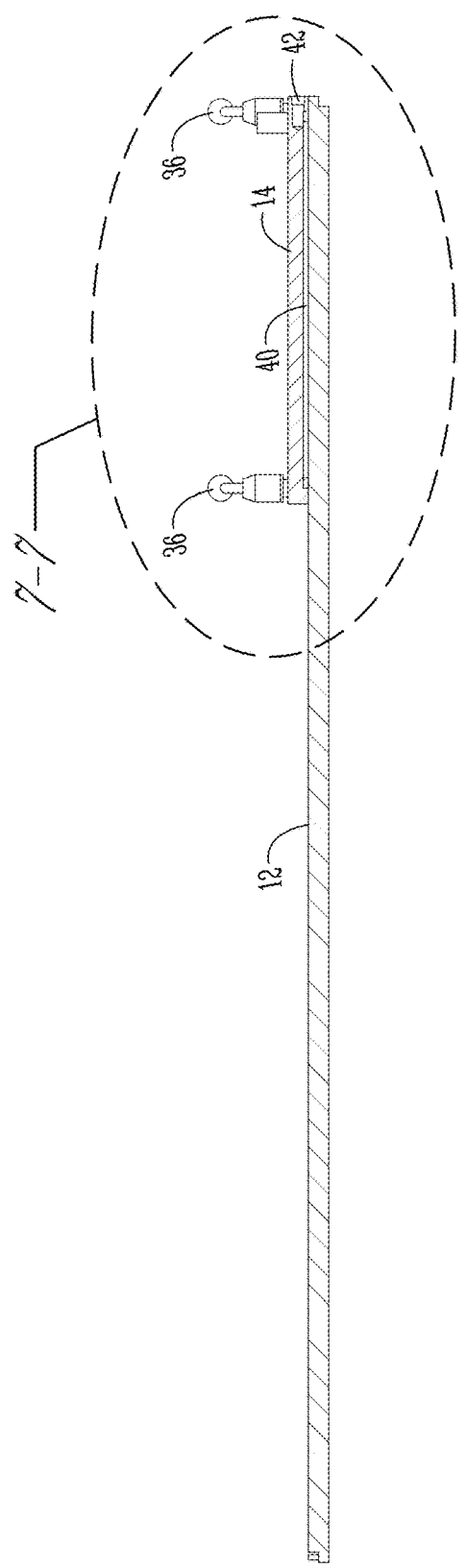
FIG. 6 is a sectional view of the assembly taken along lines 6-6 of FIG. 2.
Figure 7:
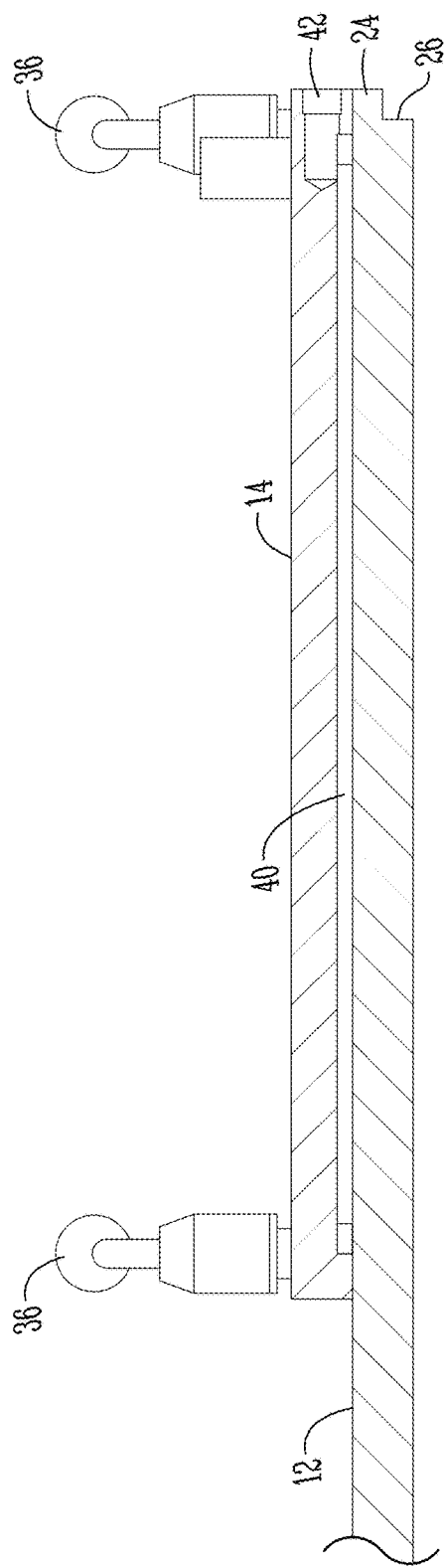
FIG. 7 is an enlarged view of a portion of the assembly taken along lines 7-7 of FIG. 6.
Figure 8:
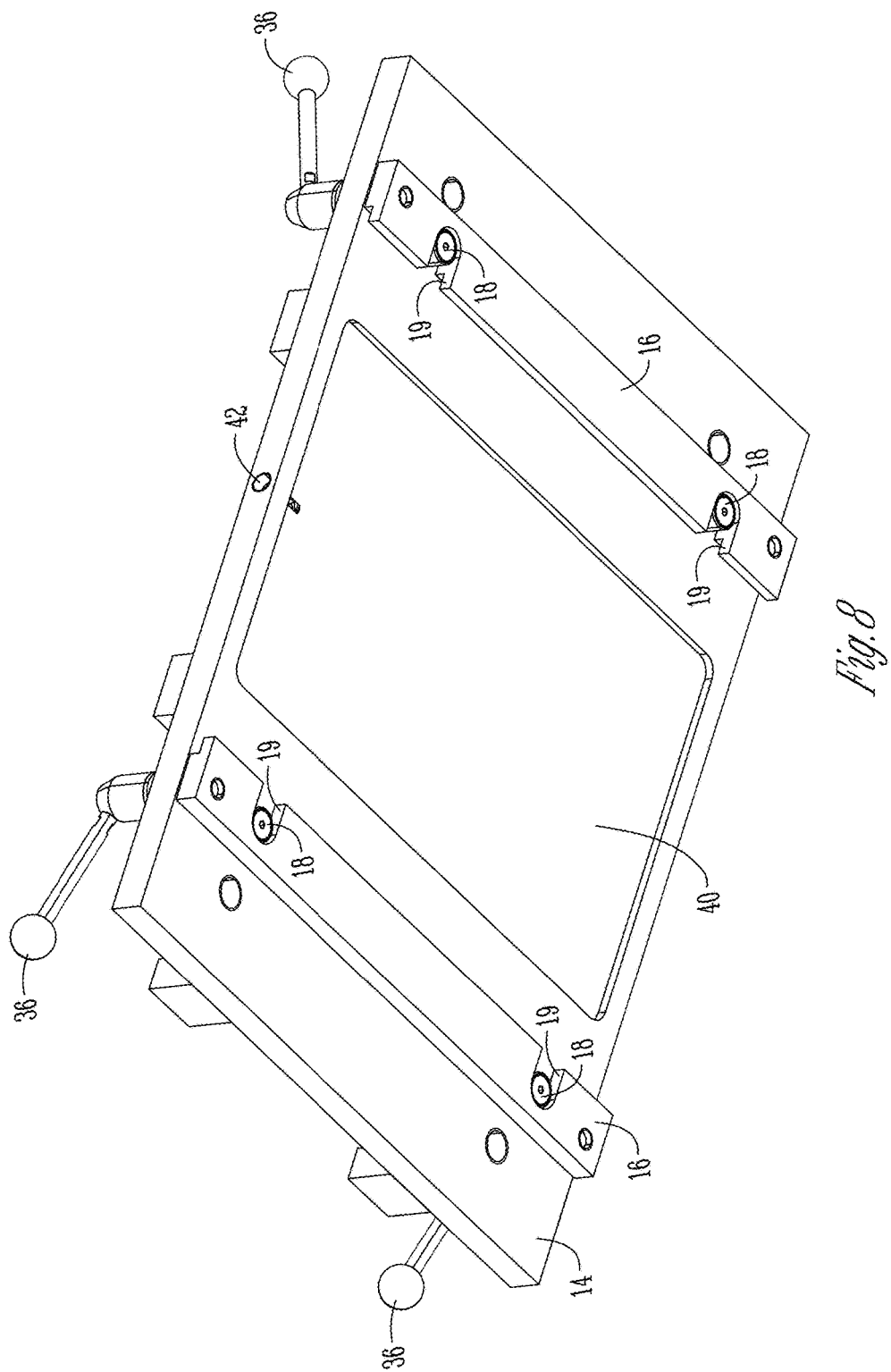
FIG. 8 is a bottom perspective view of the upper slide plate.
Figure 9:
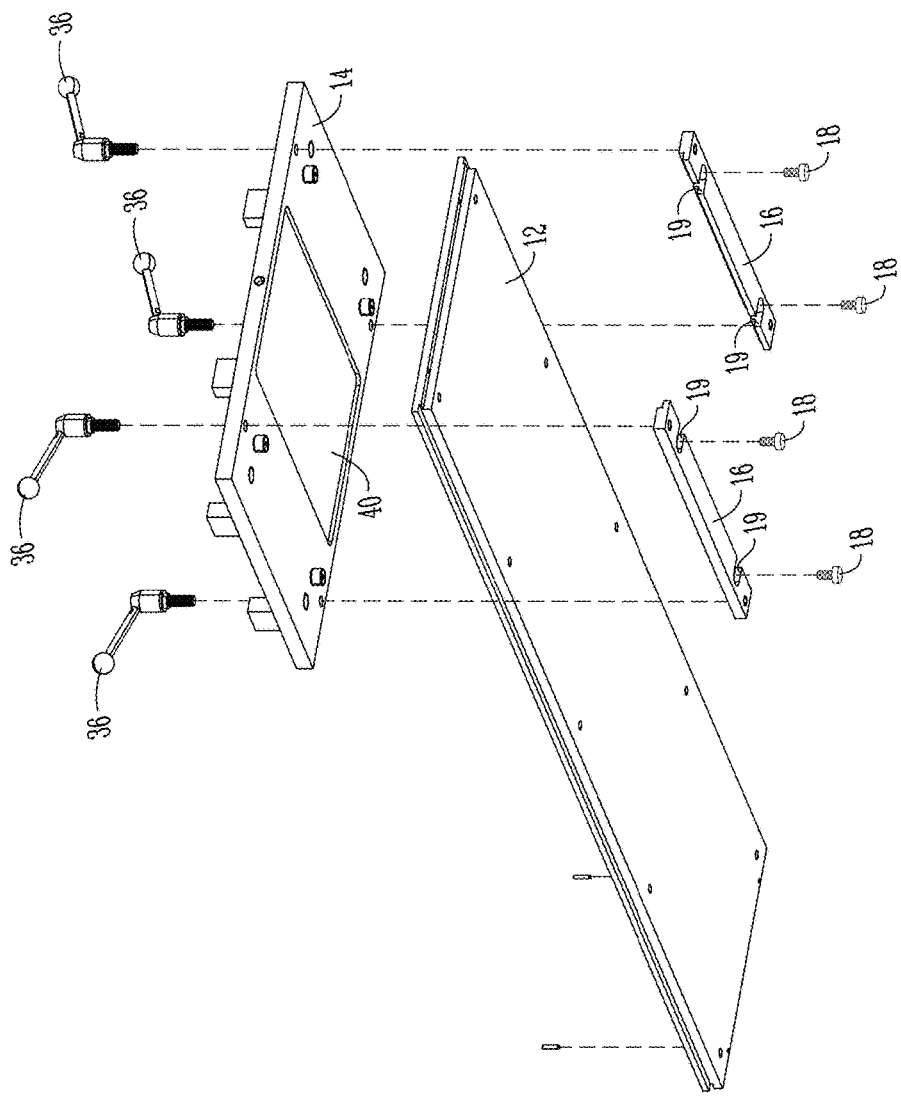
FIG. 9 is an exploded view of the assembly.
Figures 10, 12:
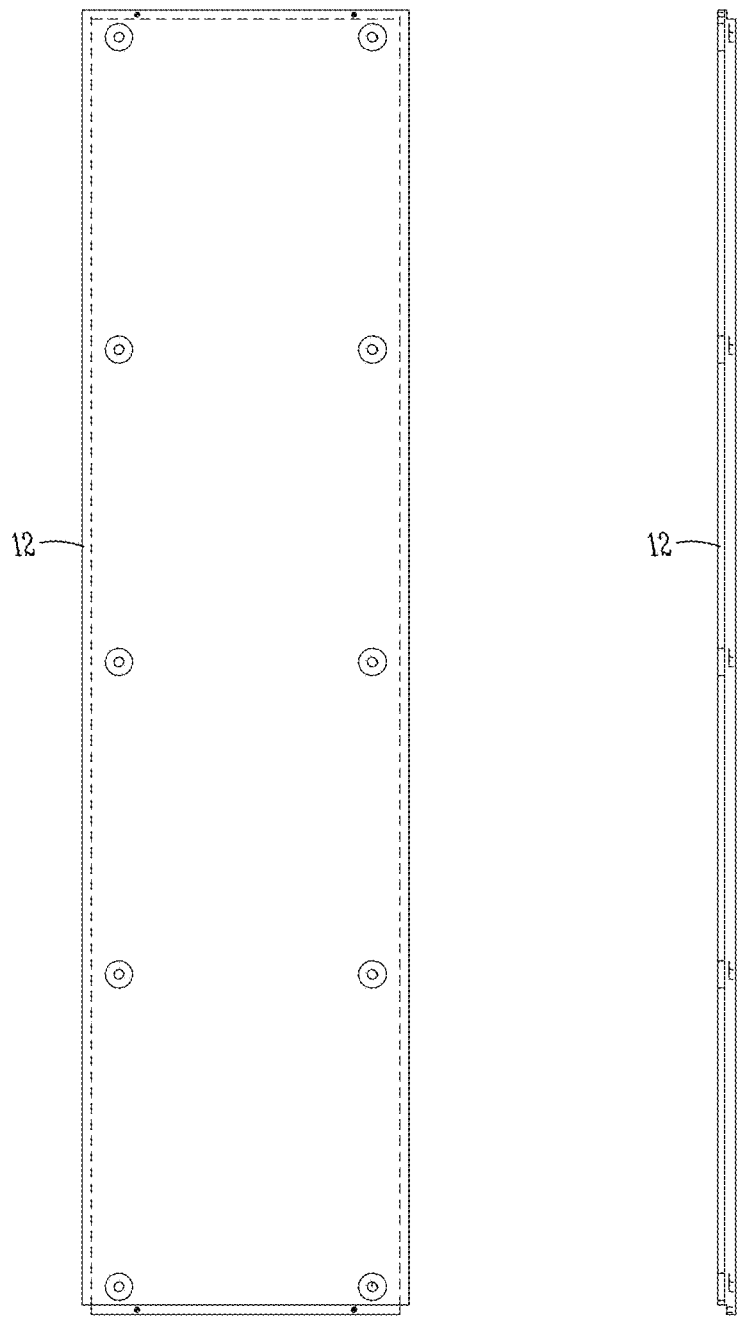
FIG. 10 is a top plan view of the row plate of the assembly.
FIG. 12 is a side elevation view of the end plate.
Figure 11:
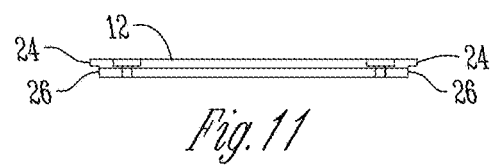
FIG. 11 is an end view of the lower plate.
Figure 13:
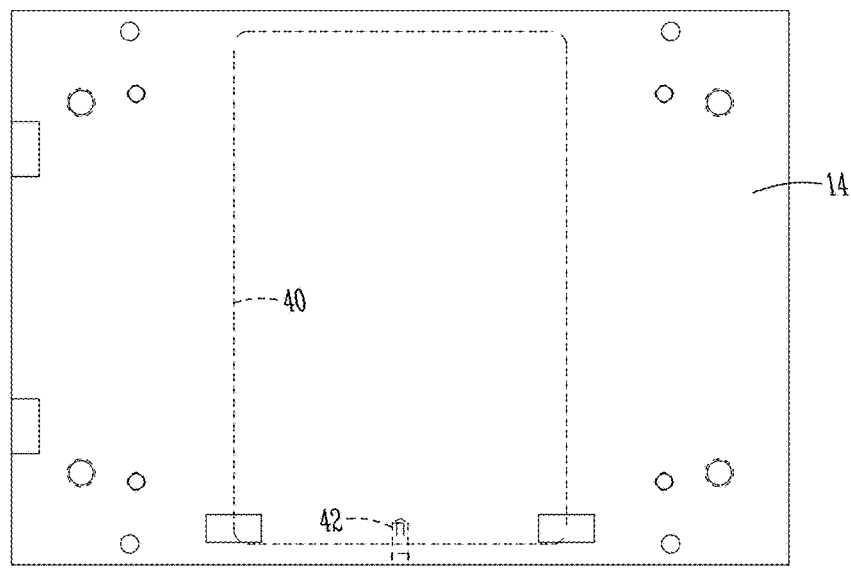
FIG. 13 is a top plan view of the slide plate of the assembly.
Figure 14:
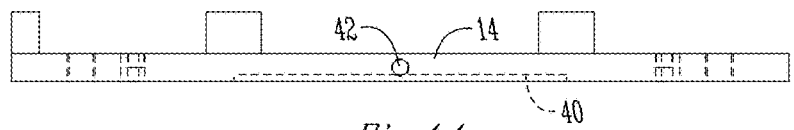
FIG. 14 is an end view of the side plate.
Figure 15:
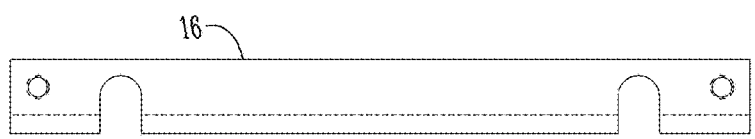
FIG. 15 is a top plan view of one of the track or guide bars of the assembly.
Figure 16:
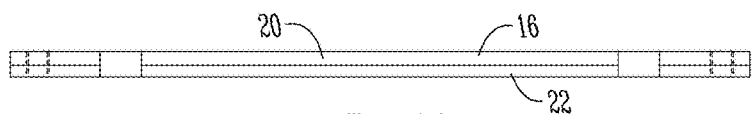
FIG. 16 is a front elevation view of the guide bar.
Figure 17:
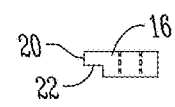
FIG. 17 is an end view of the guide bar.

As seen in FIG. 4, a pair of guide bars 16 are attached to the bottom of the upper plate 14 by threaded fasteners 19. In the embodiment shown in the drawings, the guide bars 16 include an inwardly extending lip or flange 20 which forms an upper notch 22 along the length of the guide bar 16. The opposite sides of the lower base plate 12 include outwardly extending lips or flanges 24 which form a lower notch 26 on each side of the base plate 12. As seen in FIG. 5, when the plates 12, 14 are assembled, the flange 20 of the guide bars 16 are received in the notches 26 of the lower plate 12, and the flanges 24 of the lower plate 12 are received in the notches 22 of the guide bars 16. Thus, the guide bars overlappingly engage the sides of the lower plate 12 and guide the upper plate 14 during movement of the upper plate 14 along the lower plate 12, as further described below. Roller wheels with a vertical axis or cam followers 18 are mounted in recesses or slots 19 in the bars 16, to track along the side edges of the lower plate 12, and thereby prevent binding of the upper plate 14 during movement.

Figure 1:
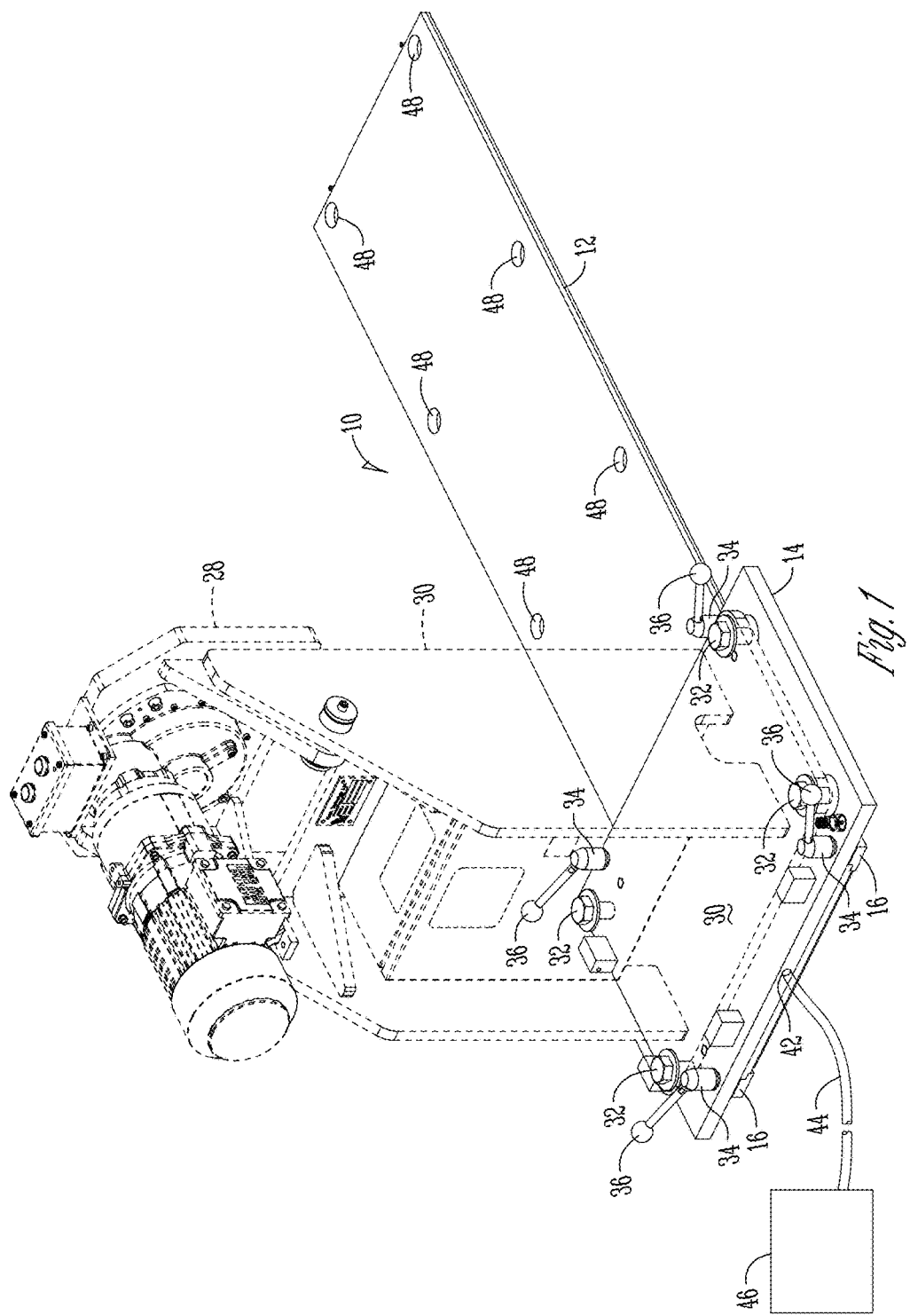
FIG. 1 is a perspective view of the pneumatic material handling assembly of the present invention, with one face plate or support mounted on the sliding plate of the assembly.

A first material handling support or face plate 28 is adapted to be mounted on the upper plate 14, in any convenient manner. For example, as shown in FIG. 1, the support 28 is mounted on a stand 30 which is secured to the upper plate 14 by plurality of bolts or fasteners 32. A second support or face plate (not shown) is fixed to the base plate 12 at a distance spaced from the first support 28. The supports are adapted to retain a work piece object, or product (generically referred to hereinafter as "work piece"), and can accommodate work pieces having various lengths by sliding the upper plate 14 along the lower plate 12. Once the upper plate 14 is in a desired position relative to the lower plate 12, locks 34 can be engaged to clamp the upper plate and the bars 16 to the lower plate 12, and thereby prevent further sliding of the upper plate 14 along the lower plate 12. The locks 34 may take various embodiments. In the preferred embodiment shown in the drawings, the locks 34 include a threaded shaft 35 extending into the guide bars 16 and a rotatable handle 36 which can be quickly and easily turned to engage and disengage the lock 34.

Movement of the upper plate 14 along the lower plate 12 is facilitated by pressurized air between the plates. More particularly, the upper plate 14 has an air pocket 40 formed in the bottom surface thereof. An air inlet 42 communicates with the air pocket 40, and has a fitting (not shown) to which a flexible air hose 44 can be quickly and easily coupled and uncoupled. The air hose 44 is connected to a source 46 of pressurized air, such an air compressor. Controls (not shown), such as valves and switches, are provided to control the introduction of air from the air source 46 to the air pocket 40. The pocket substantially contains the pressurized air, without the use of gaskets or seals. When the upper plate 14 is floating, a small amount of air escapes from the gap between the plates 12, 14.

The base plate 12 is preferably fixed to the floor at the manufacturing site using anchors or fasteners extending through holes 48 in the plate 12, and having heads recessed beneath the upper surface of the plate 12 so as to avoid interference with the sliding upper plate 14. The plates 12, 14 maybe made of steel or other high strength material. Preferably, the lower plate 12 has a maximum thickness of no more than one inch so as to minimize the tripping hazard at the work site.

The upper surface of the base plate 12 and the lower surface of the upper plate 14 should be smooth so as to minimize any friction between the plates. The mating surfaces maybe coated with a low friction material.

In use, when an operator needs to move the material handling supports 28 closer to one another, the controls for the air source are actuated so as to supply pressurized air to the air pocket 40 under the upper plate 14. The air lifts or floats the upper plate 14 from the lower plate 12 to allow the lower plate 14 to be slide along the upper plate 12 when the locks 34 are unlocked or disengaged. When the lower plate 14 is at the desired position, the air controls can be deactuated, and the locks 34 can be engaged so to lock the upper plate against further movement along the lower plate 12.

The pneumatic material handling assembly 10 eliminates all bearings and other moving parts for positioning the upper plate 14 relative to the lower plate, contrary to the prior art. The low profile of the base plate 12 is much shorter than prior art rail or track systems for moving work pieces. The base plate sections 12A, 12B allow the length of the base 12 to be increased or decreased, as needed.

The pneumatic air system substantially removes all friction between the plates 12, 14, such that an operator can single-handedly move large amounts of weight, and adjust the material handling equipment 28, 30 on the slide plate 14 along the base plate 12, without the need for rotor bearings, hydraulic actuators, motors and the like. The assembly 10 can be used to move any type of material handedly equipment along the lower base plate 12, such as racks, shelves, rotators, positioners, etc.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A material handling assembly for manufacturing, comprising:
    a first plate adapted to be mounted to a floor;
    a second plate mounted on the first plate for sliding movement along the first plate;
    the second plate having a lower surface with a recess formed therein and extending upwardly into the plate;
    an air inlet in the second plate communicating with the recess, the air inlet providing pressurized air to lift the second plate relative to the first plate when moving the second plate along the first plate; and
    a support on the second plate adapted to hold a work piece during a manufacturing operation.

2. The material handling assembly of claim 1 wherein the first plate has opposite sides with an upper flange and lower notch extending along the first plate on each side.

3. The material handling assembly of claim 2 further comprising a pair of bars mounted on the lower surface of the second plate and each having an upper notch and a lower flange which overlap the flanges and notches of the first plate.

4. The material handling assembly of claim 1 further comprising rollers on the second plate to guide along the first plate.

5. The material handling assembly of claim 1 wherein the plates are free from support bearings.

6. The material handling assembly of claim 1 wherein the first and second plates have adjacent mating horizontal surfaces.

7. The material handling assembly of claim 1 further comprising locks on the second plate to secure the second plate in a desired position on the first plate.

8. The material handling assembly of claim 1 wherein the first plate has holes adapted to receive anchors to fix the first plate to the floor.

9. The material handling assembly of claim 1 wherein the second plate has opposite sides extending beyond opposite sides of the first plate.

10. The material handling assembly of claim 1 wherein the first plate has an upper surface and the second plate has a lower surface, with the upper and lower surfaces of the first and second plates, respectfully, engaging one another when pressurized air is absent from the recess.

11. A pneumatic slide assembly for material handling, comprising:
- a fixed lower plate;
- a slidable upper plate slidable along a top of the lower plate;
- a support member extending upwardly from the upper plate to hold an object to be worked upon in a position above the upper plate;
- a pocket in a lower surface of the upper plate and being open to the atmosphere;
- an air inlet in the upper plate communicating with the pocket;
- wherein introduction of air into the pocket via the air inlet lifts the upper plate for sliding movement along the lower plate.

12. The pneumatic slide assembly of claim 11 wherein the upper and lower plates have opposite lateral sides, and further comprising a lip on each side of the upper plate to track along the opposite sides of the lower plate.

13. The pneumatic slide assembly of claim 11 wherein the upper and lower plates have overlapping flanges for guiding the upper plates during movement.

14. The pneumatic slide assembly of claim 11 further comprising a lock on the upper plate movable between locked and unlocked positions relative to the lower plate.

15. The pneumatic slide assembly of claim 11 wherein the upper plate has cam followers to track along the upper plate and prevent binding between the plates.

16. The pneumatic slide assembly of claim 11 wherein the upper plate is wider than the lower plate.

17. That pneumatic slide assembly of claim 11 wherein the upper and lower plates are free from obstructions therebetween.

18. The pneumatic slide assembly of claim 11 wherein the upper and lower plates have horizontal surfaces which matingly engage when pressurized air is not introduced through the inlet into the pocket.

* * * * *